(12) United States Patent
Kirby

(10) Patent No.: US 6,832,915 B1
(45) Date of Patent: Dec. 21, 2004

(54) EDUCATIONAL READING AID

(76) Inventor: Candy J. Kirby, 7070 Henry St., Fort Lupton, CO (US) 80621

( * ) Notice: Subject to any disclaimer, the term of this patent is extended or adjusted under 35 U.S.C. 154(b) by 0 days.

(21) Appl. No.: 10/789,578

(22) Filed: Mar. 1, 2004

(51) Int. Cl.[7] .............................................. G09B 17/02
(52) U.S. Cl. ...................... 434/178; 434/179; 434/181; 40/352; 116/240
(58) Field of Search ................................ 434/178, 179, 434/180, 181, 182, 183; 40/352; 116/240

(56) References Cited

U.S. PATENT DOCUMENTS

| | | | | |
|---|---|---|---|---|
| 140,135 | A | * 6/1873 | Hildreth | ...................... 434/178 |
| 1,607,544 | A | * 11/1926 | McCready | ................... 116/240 |
| 3,248,050 | A | 4/1966 | Dickson | |
| 3,287,827 | A | 11/1966 | Lippman | |
| 3,409,347 | A | 11/1968 | Vogel | |
| 3,739,739 | A | 6/1973 | Brase | |
| 3,982,332 | A | * 9/1976 | Szymczak | ................... 434/181 |
| 4,016,659 | A | * 4/1977 | Merrigan | ..................... 434/181 |
| 4,055,908 | A | * 11/1977 | Greene et al. | ............... 434/178 |
| 4,770,635 | A | 9/1988 | Gabay | |
| D358,419 | S | 5/1995 | Runyan | |

FOREIGN PATENT DOCUMENTS

| | | | | |
|---|---|---|---|---|
| GB | 2114514 A | * 8/1983 | ........... G09B/17/02 |
| GB | 2235081 A | * 2/1991 | ........... G09B/17/02 |

* cited by examiner

*Primary Examiner*—Derris H. Banks
*Assistant Examiner*—Dmitry Suhol

(57) ABSTRACT

An apparatus having a generally triangular shape and for helping a person read includes a housing with oppositely spaced edge portions and oppositely spaced end portions integral with the edge portions. The housing further has substantially planar top and bottom surfaces with respective openings formed therein and a slot formed generally medially between the top and bottom surfaces of the housing. The apparatus further includes a plurality of colored films selectively positionable into the slot and for assisting a user to differentiate a group of words in a line from a remainder of words in other lines.

12 Claims, 3 Drawing Sheets

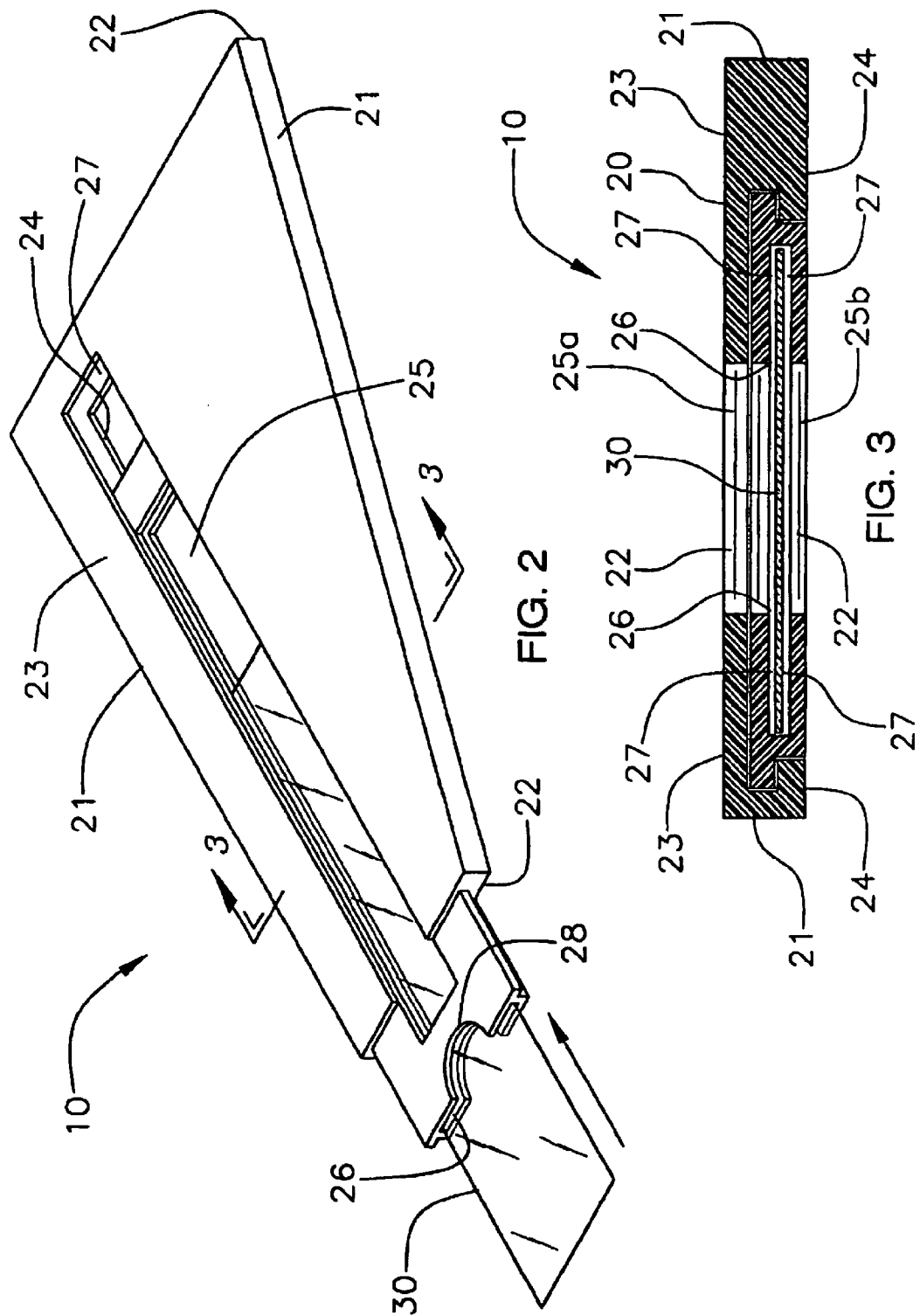

EDUCATIONAL READING AID

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a reading aid and, more particularly, to an educational reading aid.

2. Prior Art

Most cultures have a form of communication known as language. Most languages have a visual symbolic code to communicate in a visual manner. In America and many other countries today, English and Spanish are the primary languages used. In English and Spanish, the written form of communication are letters in combination to visually depict the verbal code of language. Each letter has a specific sound or sounds and in combination these letters have been given meaning. The visual depiction of the word in English and Spanish is read from left to right. This is called reading the written word. A line of symbols are read from left to right and from the top to the bottom of the page.

For many, the process of reading is an ordinary task. However, for many people, it is difficult to translate and read the language symbols (words) in a comprehensive manner. These people have a reading difficulty. Their eyes wander about the page of print, randomly moving up, down, right, left. They lose their place and their direction so that the focus of the reading process becomes blurred. For them, it is not a simple task to move their eyes from left to right, and from the top of the page to the bottom of the page, combining the symbols in a correct manner to make sense of the written print. Further, it is often difficult for these individuals to properly use phonetic skills to decode and blend a group of symbols into a meaningful word.

Problems may arise from the lack of repetitive experiences in the gross motor developmental area (i.e. left-right motor movement), which is necessary if further learning in the fine motor area is to take place (i.e. eye-hand coordination, left-right eye movement). Reading Readiness experiences are necessary in the gross and fine motor area for the student to master the proper learning of skills in reading.

In recent years there has been intensified interest in teaching machines of varied complexity which are designed to accelerate the learning progress of the student and which enable the individual student to proceed at a pace commensurate with his or her abilities. Some of these machines work on a reward system for enabling the student to advance to the next bit of information to be learned only after the correct answer is designated by the student. These machines are, of course, complex, expensive, and require special skills in the preparation of the programs for the machine. Some of these machines or devices require special answer sheets against which the student must compare his or her answers.

Accordingly, a need remains for an inexpensive educational reading aid, which overcomes the above-noted shortcomings.

BRIEF SUMMARY OF THE INVENTION

In view of the foregoing background, it is therefore an object of the present invention to provide an educational reading aid. These and other objects, features, and advantages of the invention are provided by an apparatus for helping a person read wherein the apparatus includes a housing that has a longitudinal axis and oppositely spaced edge portions extending parallel thereto and at an oblique angle thereto respectively along a length of the housing. The housing further has oppositely spaced end portions integral with the edge portions and extending substantially orthogonal to the axis. The housing further has substantially planar top and bottom surfaces that have respective openings formed therein and extending substantially parallel to the axis.

The housing further has a slot formed generally medially between the top and bottom surfaces and extending substantially parallel to a length of the housing. The housing further has an inner surface for defining the slot and assisting to maintain the plurality of colored films at a substantially parallel position to the axis. Advantageously, the inner surface prevents the plurality of colored films from bulging upwardly and downwardly into the top and bottom openings respectively so that the apparatus does not blur a group of words disposed therebeneath.

The apparatus further includes a plurality of colored films, preferably formed from plastic, selectively positionable into the slot and for assisting a user to differentiate a group of words in a line from a remainder of words in other lines by positioning the apparatus on the line and centering the openings therealong. The housing may further have a notch formed at one of the end portion thereof for advantageously assisting a user to removably insert the plurality of colored films into the slot respectively. The notch preferably has a substantially arcuate shape and may be medially disposed between the spaced edge portions of the housing.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is an enlarged perspective view of the apparatus shown in FIG. 1;

FIG. 3 is a cross-sectional view of the apparatus shown in FIG. 2 taken along line 3—3.

DETAILED DESCRIPTION OF THE INVENTION

Figure 1:
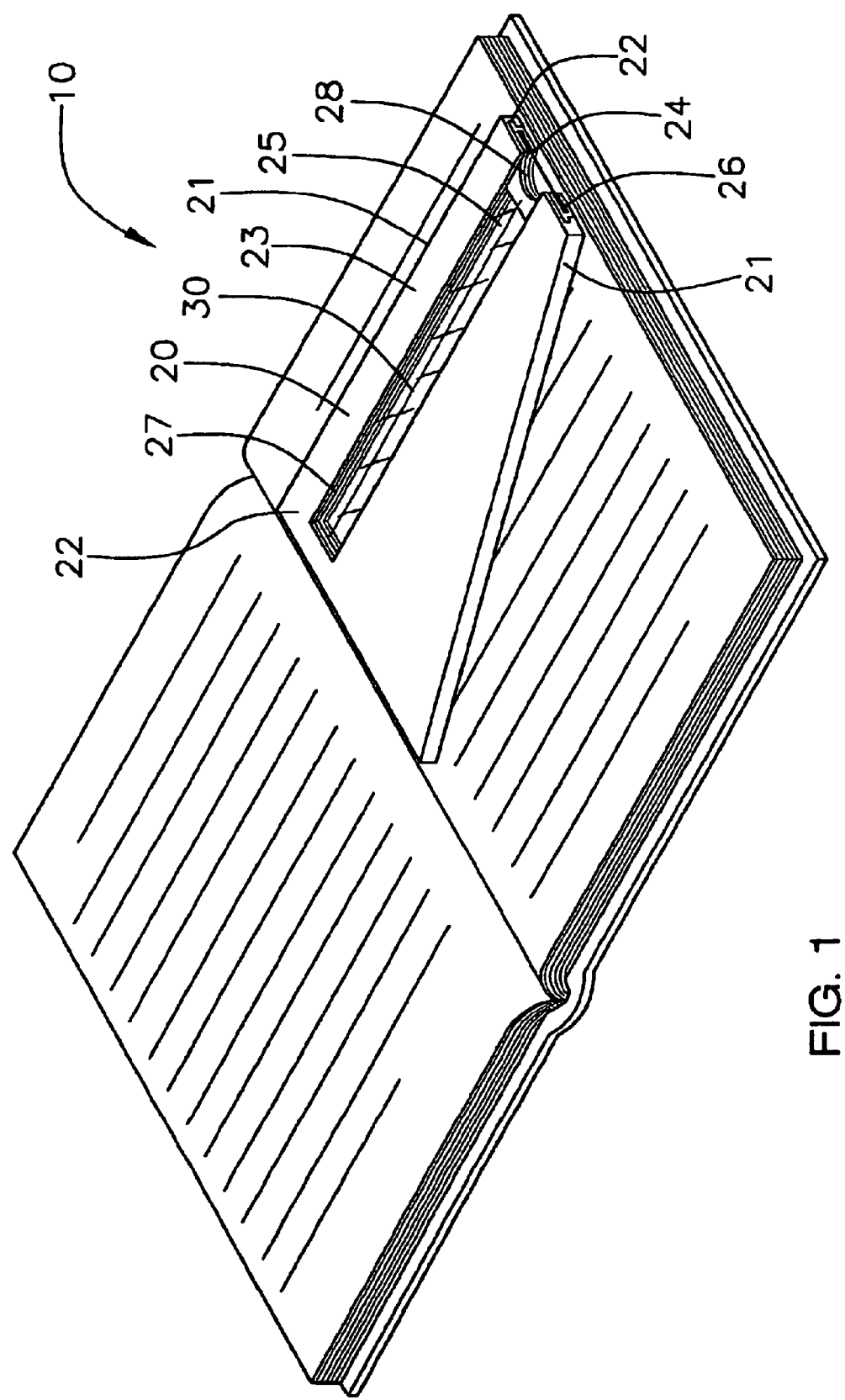
FIG. 1 is a perspective view showing an educational reading aid employed in a preferred environment, in accordance with the present invention.
Figure 4:
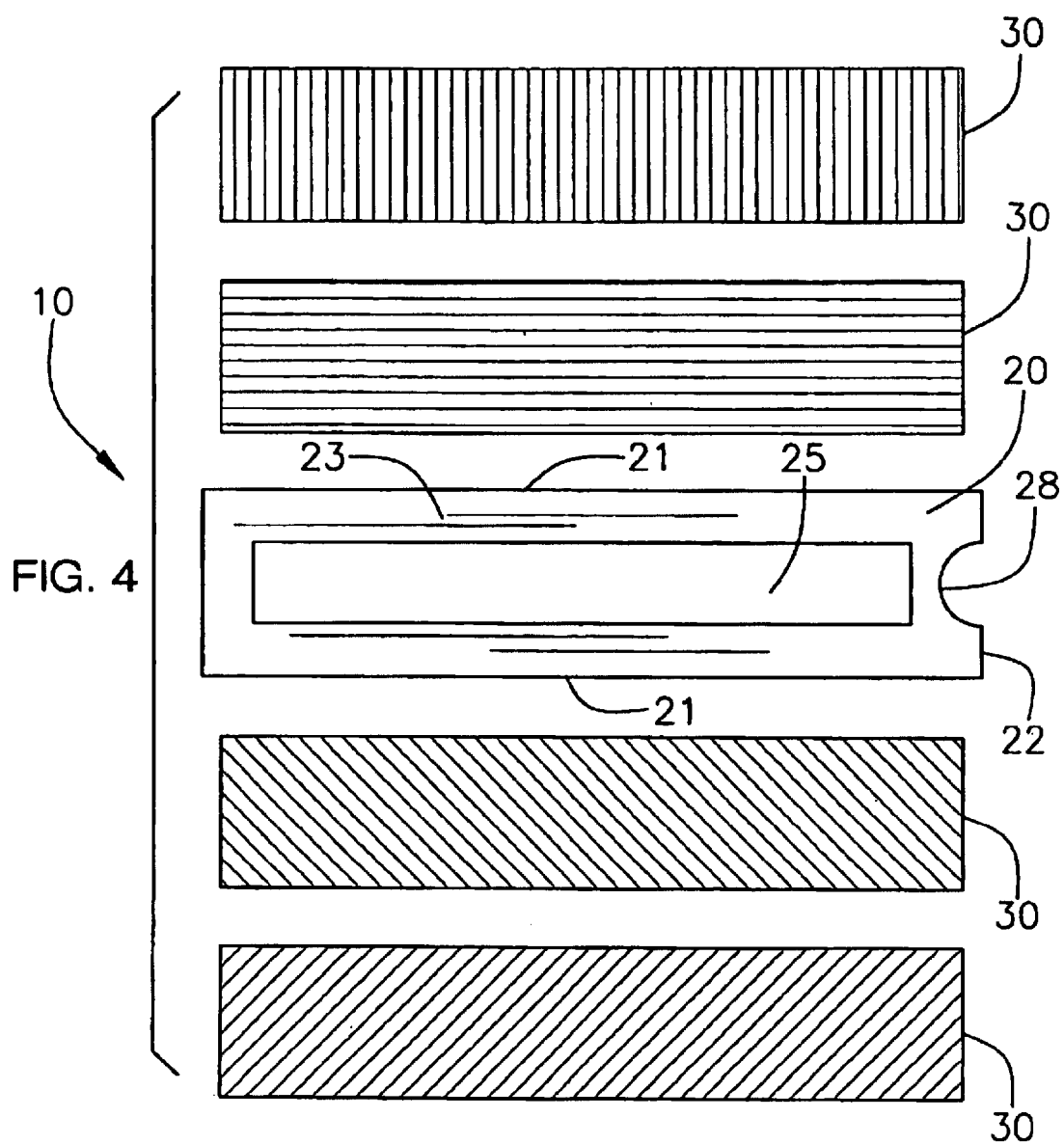
FIG. 4 is a top plan view of the apparatus shown in FIG. 1 with a plurality of colored films positioned adjacent thereto.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–4 by the reference numeral 10 and is intended to provide an educational reading aid. It should be understood that the apparatus 10 may be used to facilitate the reading of many different types of books and other such reading materials.

Referring initially to FIG. 1, the apparatus 10 includes a housing 20 that has a centrally disposed longitudinal axis and oppositely spaced edge portions 21 extending parallel thereto and at an oblique angle thereto respectively along a length of the housing 20. The housing 20 further has oppositely spaced end portions 22 integral with the edge portions 21 and extending substantially orthogonal to the axis. The housing 20 further has substantially planar top 23 and bottom 24 surfaces that have respective openings 25 formed therein and extending substantially parallel to the axis.

The housing 20 further has a slot 26 formed generally medially between the top 23 and bottom 24 surfaces and extending along a length of the housing 20. The apparatus 10 further includes a plurality of colored films 30, formed from plastic, selectively positionable into the slot 26 and for assisting a user to differentiate a group of words in a line from a remainder of words in other lines by positioning the apparatus 10 on the line and centering the openings 25 therealong. The housing 20 further has an inner surface 27 for defining the slot 26 and assisting to maintain the plurality of colored films 30 at a substantially parallel position to the axis.

Advantageously, the inner surface 27 prevents the plurality of colored films 30 from bulging upwardly and downwardly into the top 25a and bottom 25b openings respectively so that the apparatus 10 does not blur a group of words disposed therebeneath. The housing 20 further has a notch 28 formed at one of the end portions 22 thereof for advantageously assisting a user to removably insert the plurality of colored films 30 into the slot 26 respectively. The notch 28 has a substantially arcuate shape and may be medially disposed between the spaced edge portions 21 of the housing 20.

The appealing features of the apparatus 10 are its ability to teach users how to more easily focus when reading text. This versatile apparatus 10 would allow children of elementary school age range to more easily distinguish lines of text. This apparatus could just as easily be applied in an adult illiteracy class, providing these users with an easy and affordable way to further themselves in life. Instead of attempting to read a line that is buried in a distracting line grouping, the user could instead use the apparatus 10 to block out all the lines except the one he or she is trying t0 read. The user could thus focus more easily and learn to read more quickly. This apparatus 10 could also be used at home or with reading disabled students.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An apparatus for helping a person read, said apparatus comprising:
 a housing having a longitudinal axis and oppositely spaced edge portions extending parallel thereto and at an oblique angle thereto respectively along a length of said housing, said housing further having oppositely spaced end portions integral with said edge portions and extending substantially orthogonal to the axis, said housing further having substantially planar top and bottom surfaces having respective openings formed therein and extending substantially parallel to the axis, said housing further having a slot formed generally medially between said top and bottom surfaces and extending along a length of said housing; and
 a plurality of colored films selectively positionable into the slot and for assisting a user to differentiate a group of words in a line from a remainder of words in other lines by positioning said apparatus on the line and centering the openings therealong.

2. The apparatus of claim 1, wherein said plurality of colored films are formed from plastic.

3. The apparatus of claim 1, wherein said housing further has an inner surface for defining said slot and assisting to maintain said plurality of colored films at a substantially parallel position to the axis, said inner surface preventing said plurality of colored films from bulging upwardly and downwardly into the top and bottom openings respectively so that said apparatus does not blur a group of words disposed therebeneath.

4. The apparatus of claim 1, wherein said housing further has a notch formed at one said end portion thereof and for assisting a user to removably insert said plurality of colored films into the slot respectively.

5. The apparatus of claim 1, wherein the notch has a substantially arcuate shape and is disposed between said spaced edge portions of said housing.

6. An apparatus for helping a person read, said apparatus comprising:
 a housing having a longitudinal axis and oppositely spaced edge portions extending parallel thereto and at an oblique angle thereto respectively along a length of said housing, said housing further having oppositely spaced end portions integral with said edge portions and extending substantially orthogonal to the axis, said housing further having substantially planar top and bottom surfaces having respective openings formed therein and extending substantially parallel to the axis, said housing further having a slot formed generally medially between said top and bottom surfaces and extending along a length of said housing; and
 a plurality of colored films formed from plastic and being selectively positionable into the slot and for assisting a user to differentiate a group of words in a line from a remainder of words in other lines by positioning said apparatus on the line and centering the openings therealong.

7. The apparatus of claim 6, wherein said housing further has an inner surface for defining said slot and assisting to maintain said plurality of colored films at a substantially parallel position to the axis, said inner surface preventing said plurality of colored films from bulging upwardly and downwardly into the top and bottom openings respectively so that said apparatus does not blur a group of words disposed therebeneath.

8. The apparatus of claim 6, wherein said housing further has a notch formed at one said end portion thereof and for assisting a user to removably insert said plurality of colored films into the slot respectively.

9. The apparatus of claim 6, wherein the notch has a substantially arcuate shape and is disposed between said spaced edge portions of said housing.

10. An apparatus for helping a person read, said apparatus comprising:

a housing having a longitudinal axis and oppositely spaced edge portions extending parallel thereto and at an oblique angle thereto respectively along a length of said housing, said housing further having oppositely spaced end portions integral with said edge portions and extending substantially orthogonal to the axis, said housing further having substantially planar top and bottom surfaces having respective openings formed therein and extending substantially parallel to the axis, said housing further having a slot formed generally medially between said top and bottom surfaces and extending along a length of said housing, said housing further having a notch formed at one said end portion thereof and for assisting a user to removably insert said plurality of colored films into the slot respectively; and a plurality of colored films formed from plastic and being selectively positionable into the slot and for assisting a user to differentiate a group of words in a line from a remainder of words in other lines by positioning said apparatus on the line and centering the openings therealong.

11. The apparatus of claim 10, wherein said housing further has an inner surface for defining said slot and assisting to maintain said plurality of colored films at a substantially parallel position to the axis, said inner surface preventing said plurality of colored films from bulging upwardly and downwardly into the top and bottom openings respectively so that said apparatus does not blur a group of words disposed therebeneath.

12. The apparatus of claim 10, wherein the notch has a substantially arcuate shape and is disposed between said spaced edge portions of said housing.

* * * * *